United States Patent [19]
Jablonski

[11] 3,854,754
[45] Dec. 17, 1974

[54] ARM PROPELLED CYCLE

[76] Inventor: Raymond C. Jablonski, 1879 Coventry Dr., Memphis, Tenn. 38127

[22] Filed: Apr. 26, 1974

[21] Appl. No.: 464,513

[52] U.S. Cl.............................. 280/242 R, 280/249
[51] Int. Cl............................................. B62m 1/14
[58] Field of Search........ 280/242 R, 249, 240, 259, 280/252

[56] References Cited
UNITED STATES PATENTS

| | | | |
|---|---|---|---|
| 93,751 | 8/1869 | Sawhill | 280/242 R |
| 1,268,310 | 6/1918 | Wilkinson | 280/242 R |
| 1,309,331 | 7/1919 | Nelson | 280/259 |
| 3,361,224 | 1/1968 | McKim | 280/242 R |

Primary Examiner—Leo Friaglia
Attorney, Agent, or Firm—John R. Walker, III

[57] ABSTRACT

A tricycle which may be propelled by the arms of the rider as he is supported thereon in a prone position. The forward or drive wheel is driven by the rider as he grasps a pair of hand-grips which respectively are rotatably attached to a pair of opposing crank members. A typical coaster-brake couples the crank members to the drive wheel to enable the rider to cease turning the crank members for coasting, steering, and braking purposes. A slide-bar is included which is established in part by one of the crank members and enables one of the hand-grips to be shifted from a drive position wherein the hand-grips are radially displaced 180° one from the other to a coaster-steering position wherein the hand-grips are radially aligned one with the other.

6 Claims, 7 Drawing Figures

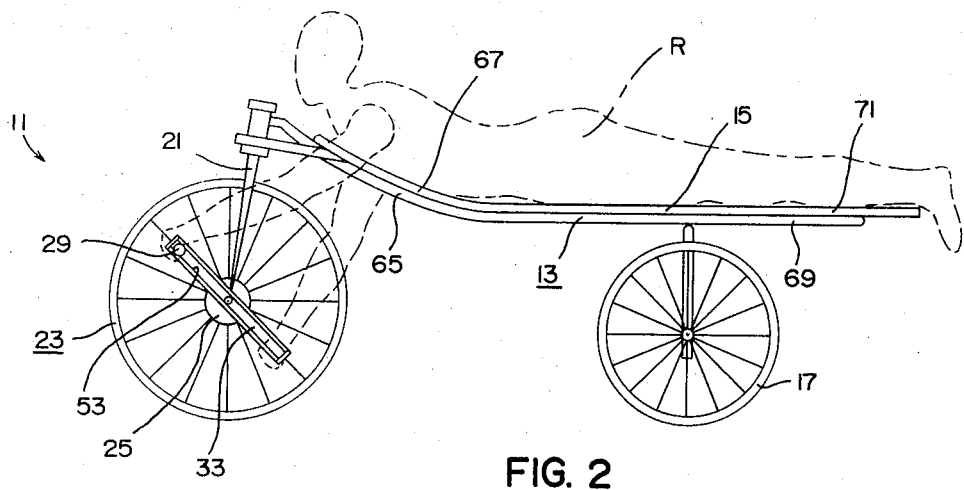
FIG. 1
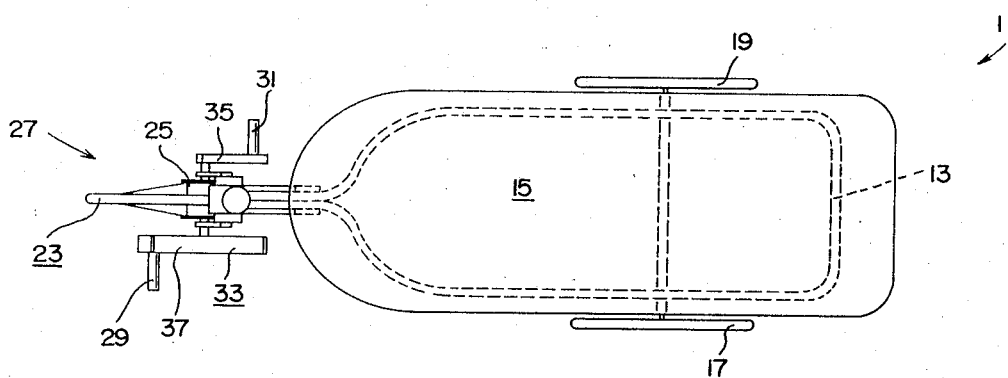
FIG. 2
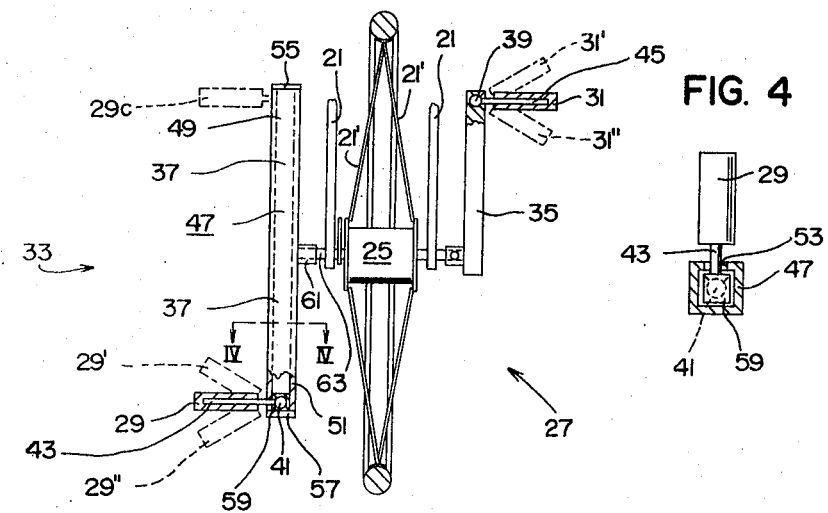
FIG. 3
FIG. 4

PATENTED DEC 17 1974  3,854,754

ARM PROPELLED CYCLE

BACKGROUND OF THE INVENTION

1. Field of the Invention

This invention relates to the field of arm propelled cycles.

2. Description of the Prior Art

Applicant is aware of the following U.S. Pat. Nos.: Searle 440,442; Wilkinson 1,268,310; Nelson 1,309,331; Kuznetzoff 1,349,891; Wakefield 1,546,765; and Stocking 3,123,379. None of the above patents suggest or disclose applicant's device. However, it should be pointed out that the benefits and advantages derived by driving a tricycle from a prone position were previously disclosed in the above-mentioned '310 patent. The following is a quote therefrom:

It will be noted that the parts are so proportioned as to hold the body 9 in an inclined position. Thus the occupant of the vehicle will lie in an inclined position and, by reaching down at opposite sides of the tongue 11, can grasp the cranks 23 and propel the vehicle. As the body is inclined the muscles of the chest will not be cramped and the user can readily propel the vehicle whereas, should one lie in a horizontal position, it becomes practically impossible to operate the vehicle in this manner without creating considerable fatigue. The manner of propelling the vehicle from an inclined body as been found to be very beneficial in straightening the back, throwing back the shoulders and developing the chest and for these reasons, as well as the entertainment afforded, the vehicle has been prescribed by physicians and used by invalid children.

Certain problems prevail with prior arm propelled tricycles. A few of these problems are as follows: First, prior known devices are directly driven. Accordingly, the rider is not afforded the advantage of ceasing to operate the crank for coasting purposes. Secondly, stopping or braking these prior vehicles has been a prevailing problem from the onset. Third, steering these prior tricycles has also been a prevailing problem since the rider's hands are not free to operate conventional handle bars or the like.

SUMMARY OF THE INVENTION

The present invention is directed towards overcoming the disadvantages and problems relative to previous hand propelled cycles. The tricycle of the present invention may be propelled by the arms of the rider as he is supported thereon in a prone position. The forward or drive wheel is rotatably driven by the rider as he grasps a pair of hand-grips which respectively are rotatably attached to a pair of opposing crank members. A coaster-brake couples the crank members to the drive wheel to enable the rider to cease turning the crank members for coasting, steering, and braking purposes. A slide-bar is included which is established in part by one of the crank members and enables one of the hand-grips to be shifted from a drive position wherein the hand-grips are radially displaced 180° one from the other to a coaster/steering position wherein the hand-grips are radially aligned one with the other. A pair of ball-socket-joints are provided to further facilitate steering the tricycle of the present invention. The respective ball-socket-joints couple the rotatable hand-grips to the pair of opposing crank members.

DESCRIPTION OF THE DRAWING

FIG. 1 is a side elevational view of the cycle of the present invention, showing in phantom a rider suitable supported thereon.

FIG. 2 is a top view of the cycle of the present invention.

FIG. 3 is a sectional view of the front or drive wheel of the cycle of the present invention showing the slide-bar and the pair of ball-socket-joints.

FIG. 4 is a sectional view taken as on the line IV—IV of FIG. 3

DESCRIPTION OF THE PREFERRED EMBODIMENT

Figure 5:
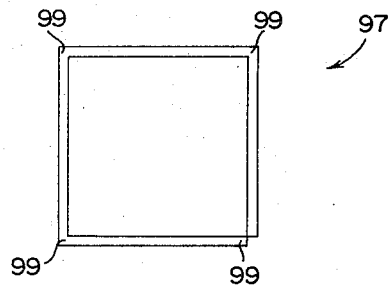
FIG. 5 is a view of certain spring structure associated with a particular coaster brake.

The arm propelled cycle 11 of the present invention is intended for carrying a rider disposed in a prone position thereon, i.e., the rider is characterized in FIG. 1 of the drawing by the letter R and is shown therein suitably mounted on the cycle 11. The cycle 11 generally comprises frame means, as at 13, including an elongated body board 15, for supporting the rider R in a prone position. Also included is a pair of axially aligned rearward wheels 17, 19 rotatably attached to the frame means 13. Additionally, downwardly directed fork means 21 is included and is pivotally attached to the frame means 13 for pivotal movement about a substantially vertical axis. Further, forward wheel means, as at 23, is included having coaster-brake means, as at 25, for rotatably attaching the forward wheel means 23 to the lower end of the fork means 21. The coaster-brake means 25 will be more fully disclosed later in the specification. Further, crank means, as at 27, is included which is coupled to the coaster-brake means 25 and is operable therewith for selectively propelling the cycle 11, stopping the cycle 11, and steering the cycle 11. The crank means 27 includes a pair of hand-grip members, as at 29, 31, rotatably attached thereto for permitting the rider R to manipulate the crank means 27 by grasping the hand-grip members 29, 31. Further yet, a slide-bar means, as at 33, is included and is established in part by the crank means 27. The slide-bar means enables one of the hand-grip members, as at 29, to be slidably shifted relatively to the other. More specifically, the hand-grip member 29 is movable from a drive position clearly shown in solid lines in FIG. 3 of the drawing wherein the hand-grip members 29, 31 are radially displaced 180° one from the other to a coasting/steering position, shown in broken lines and character referenced in FIG. 3 of the drawing by the numeral 29c wherein the hand-grip members 29, 31 are radially aligned one with the other.

The crank means 27 includes a pair of opposing crank members, as at 35, 37, with the crank member 37 establishing in part the slide-bar means 33 in a manner which will be more fully disclosed as the specification proceeds.

The cycle 11 includes means, e.g., first and second ball-and-socket joint members 39, 41, for permitting considerable relative angular movement in any plane of either of the pair of hand-grip members 29, 31. More specifically, the ball-and-socket-joint members 39, 41 respectively couple the pair of hand-grip members, 29, 31 to the crank members 35, 37. The hand-grip members 29, 31 are free to pivot about their respective shaft members 43, 35 and are free to be moved angularly in any plane with the movement within one plane thereof being shown in FIG. 3 of the drawing and character referenced therein by the numerals 29', 29'' and 31', 31''.

The slide bar means 33 includes an elongated tubular member, as at 47, having first and second remote ends thereto, as at 49, 51. The tubular member 47 is provided with an elongated slit, as at 53, for allowing the shaft member 43 to protrude outwardly therefrom. In other words, the hand-grip member 29 is free to slide along the slit 53 from the drive position clearly depicted in FIG. 3 wherein the pair of hand-grip members 29, 31 are radially displaced 180° one from the other upwardly (as depicted) to a coasting/steering position, shown in broken lines in FIG. 3 and character referenced therein by the numeral 29 and the suffix c, wherein the pair of hand-grip members 29, 31 are radially aligned one with the other.

A pair of slide stops 55, 57 are included and are fixedly attached, as by welding or the like, to the respective first and second ends 49, 51. The slide stops 55 simply close the opposite ends of the tubular member 47 to prevent the hand-grip member 29 from becoming disengaged therefrom.

The tubular member 47 may have a circular inner wall in which event the ball 41 is simply slidably engaged therewith. On the other hand, the tubular member 47 may have a rectangular inner wall as shown in FIG. 4 of the drawing in which event a slide block member, as at 59, is included for receiving the ball 41. In other words, the slide block member 59 is slidably received in the elongated tubular member with the block member 59 being free to slide between the first and second ends 49, 51 thereof. Further, the hand-grip member 29 is attached to the block member 59 for slidable movement therewith. The elongated tubular member 47 includes a centrally disposed portion, as at 61, which is axially aligned with the forward wheel means 23 and is fixedly attached to the crank means 27, or more specifically to a drive shaft 63 (FIG. 3) which is an integral part of the coaster-brake means 25.

From FIG. 1 of the drawing it may clearly be seen that the forward portions of the frame 13 and the body board 15 slope upwardly, as at 65, 67 from substantially horizontally disposed rearward portions, as at 69, 71 whereby the upper torso of the rider R may be disposed in an inclined prone position when supported on the body board, i.e., the rider R being in a forward facing position as clearly shown in FIG. 1 of the drawing.

It should be understood that when the hand-grip member 29 is in the lower or drive position clearly depicted in solid lines in FIG. 3 the rider R uses his arms and hands to rotatably drive the forward wheel means 23 to propel the cycle 11. Additionally, the rider R may stop the cranking motion with his arms and hands to allow the cycle to coast or to apply braking action thereto, i.e., the braking action being applied by simply reversing the direction of travel of the crank means 27.

Further, the hand-grip member 29 may be shifted to the position 29c to facilitate pivoting the fork means 21 about its substantially vertical axis to facilitate steering the cycle 11.

Figure 6:
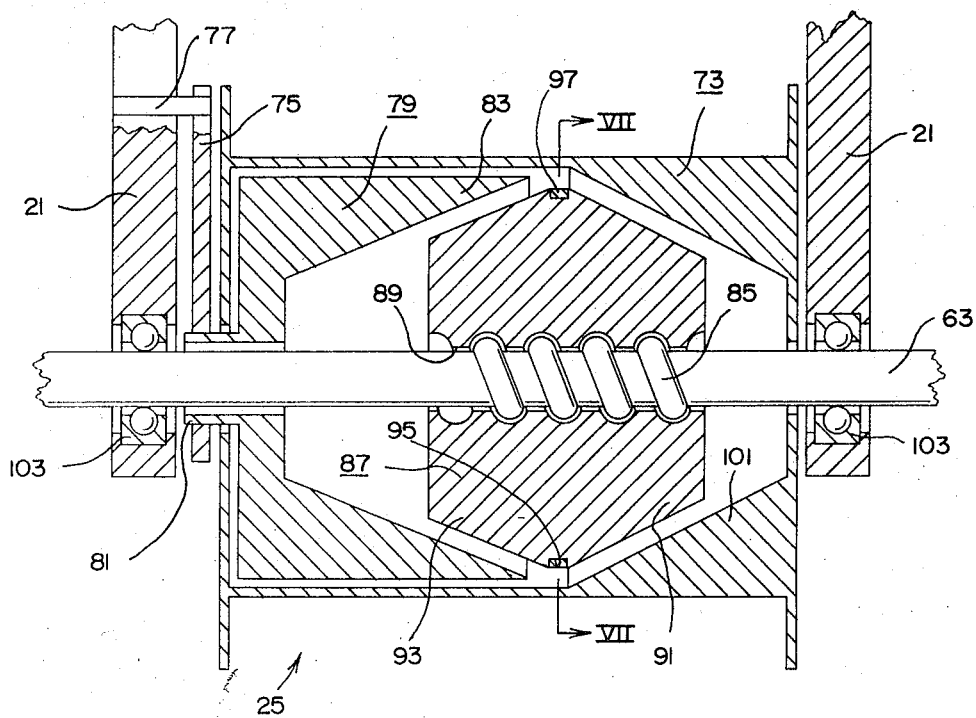
FIG. 6 is a sectional view with the cut being taken through the vertical centerline of particular coaster-brake structure having direct drive and which may be incorporated with the present invention.

Particular attention is now directed to FIG. 6 of the drawings wherein it may be seen that the coaster-brake 25, in addition to the previously mentioned drive shaft 63, includes a circular tubular hub housing member 73 which is adapted to be rotatably driven by the shaft 63 in a manner to be disclosed. It will be understood that hub housing member 73 is the hub of wheel 21 to which the spokes 21' of wheel 21 are attached in the usual manner. Additionally, a brake arm member 75 is included which is rigidly attached to the fork means 21 by suitable clamp or strap structure, as at 77. Also included is a brake cylinder 79 which is received within the hub housing member 73 with the drive shaft 63 extending concentrically therethrough. The brake cylinder 79 includes an outwardly projecting annular member 81 through which drive shaft 63 rotatably extends. The member 81 includes a square shoulder outer portion (not shown) which is fixedly received in a square hole provided in the brake arm member 75. Accordingly, the brake cylinder 79 is fixed relative to fork means 21 and hub housing member 73 is rotatable relative to brake cylinder 79. It should be understood that one end of the hub member 73 rotates about the outwardly projecting member 81. The brake cylinder 79 also includes an inwardly directed expandable split sleeve or frustroconical portion 83 which coacts with the hub member 73 and other structure in a manner yet to be disclosed.

The drive shaft 63 includes a worm gear portion 85 defining the intermediate portion thereof and is disposed within the housing member 73 as clearly shown in FIG. 6 of the drawings. The coaster-brake means 25 also includes a power transmitting/braking member 87 which may hereinafter simply be referred to as a shiftable cone member or cone member since it shifts from a driving or power transmitting position to a braking position in a manner about to be fully disclosed. The shiftable cone member 87 is situated within the hub member 73 and is provided with a concentric aperture 89 which is suitably threaded for threaded engagement with the worm gear portion 85. The cone member 87 includes first and second remotely disposed convex frustroconical portions, as at 91, 93 respectively.

Figure 7:
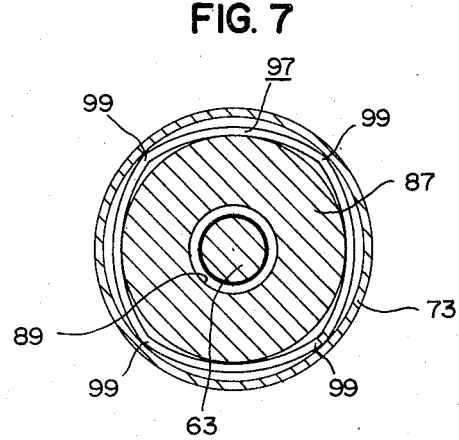
FIG. 7 is a sectional view taken as on the line VII-VII of FIG. 6.

Further, the cone member 87 is provided with an annular groove 95 which is interposed between the portions 91, 93. A drag spring 97 is included which is shown in a relaxed condition in FIG. 5 of the drawings. The drag spring 97 is received in the groove 95 and yieldably grips the shiftable cone member 87 to create a slight drag against rotation with the shaft 63, as best shown in FIG. 7 of the drawings, i.e., the spring 97 is shown under tension therein. The squarelike shape of the spring 97 provides corners or hub housing engaging portions 99 which are yieldably urged outwardly for never ceasing engagement with the inner surface of the hub housing 73, i.e., the portions 99 constantly engage the hub housing 73 irrespective of whether the coaster-brake is driving, coasting, or braking.

Therefore, the spring 97 creates sufficient drag upon the shiftable cone member 87 to cause it to shift towards the right when the drive shaft 63 is rotated in a forward or drive direction and is caused to shift to the left when the drive shaft 63 is rotated in a reverse or braking direction. The drag spring 97 also allows the shiftable cone member 87 to remain in a neutral position for coasting purposes, as clearly depicted in FIG. 6.

The hub housing member 73 includes a frustroconical portion 101 which is confrontingly arranged with respect to the frustroconical portion 91 of the shiftable cone member 87. Accordingly, forward rotation of the drive shaft 63 is effective to shift the shiftable cone member 87 to the right which frictionally engages respectively the surface areas of the two conical portions 91 and 101, one with the other. It will be understood that when conical portion 91 frictionally engages portion 101, the spring 97 will compress into groove 95. From the above it will be apparent that the hub housing member 73 and wheel 23 are rotatably driven as the drive shaft 63 is continued to be rotated. Ceasing rotation of the drive shaft 63 tends to carry or rotate the shiftable cone member 87 with the hub housing member 73, i.e., only a slight rotation is achieved since the mating, as described, of the member 87 to the shaft 63 assures that one cannot rotate without the other except to achieve left and right movement through the worm gear 85. Therefore, since the shaft 63 is now stationary, this slight rotation of the shiftable cone member 87 causes it to be carried to the left or to the neutral or coasting position by the worm gear 85.

On the other hand, reverse rotation of the drive shaft 63 is effective to shift the shiftable cone member 87 to the left, i.e., from the neutral position, which frictionally engages the two conical portions 83, 93 in somewhat the same manner as just described for the portions 91 and 101. An increase of reverse directed pressure causes the expandable sleeve frustroconical portion 83 to expand outwardly against the inner surface of the hub member 73. Thus, friction is created to retard rotation of the hub member 63. Further increase of reverse directed pressure causes increased braking action.

The inclination of the worm gear 85 is rather fast, i.e., only a slight rotation of the shaft 63 is required to achieve considerable lateral movement of the shiftable cone member 87. Therefore, at any time while coasting, at the discretion of the rider R, the coaster-brake means 25 may be engaged to drive the cycle 11. In other words, even though the spring 97 is being rotated with the hub housing member 73, the forward directed rotation of the shaft 63 tends to drive the shiftable cone member 87 at a much higher speed, therefore, the difference in the two rates of speed results in sufficient drag being developed to cause lateral shifting (to the right) of the member 87. Obviously, once it frictionally engages the hub housing member 73 it then drives the member 73. It should be pointed out that the spring 97 probably is not rotating with the member 73 while coasting but rather the spring is stationary with the shiftable cone member 87. However, the effect is the same regardless of whether the spring 97 is rotating or a rotating force is acting upon it, i.e., since the spring 97 is yieldably urged outwardly against the rotating hub housing member 73 as previously disclosed.

It will be understood from the foregoing description that the primary driving force is by the frictional contact between the portions 91 and 101, and not a direct effect from the contact of spring 97 with portion 101. The function of spring 97 is primarily to provide the drag heretofore described.

A pair of bearing assemblies 103 are included for conveniently rotatably supporting the coaster brake means 25 from the fork means 21. The bearing assemblies are somewhat like well known bearing assemblies used for supporting the drive wheel of a typical velocipede. Therefore, it is believed that further elaboration is unnecessary.

Although the invention has been described and illustrated with respect to a preferred embodiment thereof, it is to be understood that it is not to be so limited since changes and modifications may be made therein which are within the full intended scope of the invention.

I claim:

1. An arm propelled cycle for carrying a rider disposed in a prone position thereon, said cycle comprising frame means including an elongated body board for supporting the rider in a prone position, a pair of axially aligned rearward wheels rotatably attached to said frame means, downwardly directed fork means pivotally attached to said frame means for pivotal movement about a substantially vertical axis, forward wheel means having coaster-brake means for rotatably attaching said forward wheel means to the lower end of said fork means; crank means coupled to said coaster-brake means and being operable therewith for selectively propelling said cycle, stopping said cycle, and steering said cycle; said crank means having a pair of hand-grip members rotatably attached thereto for permitting the rider to manipulate said crank means by grasping said hand-grip members, and slide-bar means established in part by said crank means for enabling one of said hand-grip members to be slidably shifted relative to the other from a drive position wherein said hand-grip members are radially displaced 180° one from the other to a coasting-steering position wherein said hand-grip members are radially aligned one with the other.

2. The cycle of claim 1 in which is included means for permitting considerable relative angular movement in any plane of either of said pair of hand-grip members.

3. The cycle of claim 1 in which said means for permitting considerable relative angular movement in any plane of either of said pair of hand-grip members includes first and second ball-and-socket joint members respectively coupling said pair of hand-grip members to said crank means.

4. The cycle of claim 1 in which said slide-bar means includes an elongated tubular member having first and second remote ends thereto, a block member slidably received in said elongated tubular member with said block member being free to slide between said first and second ends of said elongated tubular member, one of said pair of hand-grip members being attached to said block member for slidable movement therewith, and said elongated tubular member having a centrally disposed portion axially aligned with said forward wheel means and being fixedly attached to said crank means.

5. The cycle of claim 1 in which the forward portions of said frame and body board slope upwardly from substantially horizontally disposed rearward portions whereby the upper torso of the rider may be disposed in an inclined prone position when supported on said body board.

6. An arm propelled cycle for carrying a rider disposed in a prone position thereon, said cycle comprising frame means including an elongated body board for supporting the rider in a prone forward facing position, said frame and body board sloping upwardly from substantially horizontally disposed rearward portions whereby the upper torso of the rider may be disposed thereon in an inclined prone position, a pair of axially aligned rearward wheels rotatably attached to said frame means, downwardly directed fork means pivotally attached to said frame means for pivotal movement about a substantially vertical axis, forward wheel means having coaster-brake means for rotatably attaching said forward wheel means to the lower end of said fork means; crank means coupled to said coaster-brake means and being operable therewith for selectively rotatably driving said forward wheel means to propel said cycle, stopping said forward wheel means to apply braking action to said cycle, and pivoting said fork means to steer said cycle; said crank means having a pair of hand-grip members rotatably attached thereto for permitting the rider to manipulate said crank means by grasping said hand-grip members while lying in a prone position upon said body board, an elongated tubular member having first and second remotely disposed closed ends thereto, a slidable block member slidably received in said elongated tubular member with said slidable block member being free to slide between said first and second ends of said elongated tubular member, a first ball-and-socket joint member coupling one of said hand-grip members to said slidable block member for slidable movement therewith, said elongated tubular member having a centrally disposed portion axially aligned with said forward wheel means and being fixedly attached to said crank means, said elongated tubular member establishing in part said crank means whereby said one of said pair of hand-grip members is free to be slidably shifted relative to the other of said pair of hand-grip members from a drive position wherein said pair of hand-grip members are radially displaced 180° one from the other to a coasting/steering position wherein said pair of hand-grip members are radially aligned one with the other, and a second ball-and-socket joint member coupling the other one of said pair of hand-grip members to said crank means whereby said pair of hand-grip members respectively are permitted considerable relative angular movement in any plane irrespective of the position of said crank means and said slidable block means.

* * * * *